United States Patent [19]

Tielens et al.

[11] 4,238,159
[45] Dec. 9, 1980

[54] APPARATUS FOR EXTRACTING ALUMINA FROM BAUXITE

[75] Inventors: Arther J. Tielens, Bad Homburg; Wolfgang Müller; Erich K. Todtenhaupt, both of Schopfheim, all of Fed. Rep. of Germany

[73] Assignee: Ekato-Werk Erich Karl Todtenhaupt, Schopfheim, Fed. Rep. of Germany

[21] Appl. No.: 26,061

[22] Filed: Apr. 2, 1979

Related U.S. Application Data

[60] Continuation of Ser. No. 866,932, Jan. 4, 1978, abandoned, which is a division of Ser. No. 703,649, Jul. 8, 1976, abandoned.

[30] Foreign Application Priority Data

Jul. 15, 1975 [DE] Fed. Rep. of Germany ....... 2531646

[51] Int. Cl.³ .............................................. B01F 7/18
[52] U.S. Cl. .................................. 366/327; 366/329
[58] Field of Search ................ 366/325, 327, 329, 330

[56] References Cited

U.S. PATENT DOCUMENTS

| 3,374,989 | 3/1968 | Todtenhaupt ...................... 366/325 |
| 3,671,019 | 6/1972 | Tapscott et al. ................. 366/329 X |

Primary Examiner—Philip R. Coe
Attorney, Agent, or Firm—Michael J. Striker

[57] ABSTRACT

A supersaturated solution of ground bauxite and caustic soda is fed to a plurality of stirrer tanks in a product cascade. Each of these stirrer tanks of the product cascade has three vertically spaced zones with differing solid contents, a central vertical shaft and at least three vertically spaced paddles carried on the shaft and each extending into a respective one of the zones. The paddles are so constructed as to differently act on the solid in dependence upon the solid contents in each zone.

16 Claims, 17 Drawing Figures

APPARATUS FOR EXTRACTING ALUMINA FROM BAUXITE

This is a continuation of application Ser. No. 866,932, filed Jan. 4, 1978, which in turn is a division of application Ser. No. 703,649, filed July 8, 1976, both now abandoned.

BACKGROUND OF THE INVENTION

The present invention relates to an apparatus for manufacturing alumina. More particularly this invention concerns an apparatus for extracting alumina from bauxite.

There are two main methods of extracting alumina from bauxite, the so-called European and American methods. The European bauxite mainly contains a monohydrate that is used along with concentrated lye to produce a fine-grained aluminum hydrate. In the United States the bauxite mainly contains a trihydrate so that coarse grain aluminum hydrate can be produced using diluted lye.

In both methods the bauxite is ground, mixed with a caustic-sode solution of a specific concentration and agitated in an autoclave. According to the European method a temperature of approximately 240° C. and a pressure of approximately 45 bars is used. With the American method the temperature is approximately 150° C. and the pressure is only 5 bars. Furthermore the concentration in the digestion lye according to the European method is approximately 325 g/l to 600 g/l (expressed as $Na_2CO_3$) and in the American method the concentration is normally 160 g/l to 200 g/l. The ratio of the dissolved aluminum oxide in grams per liter to the dissolved caustic sode in grams per liter, normally referred to as the A/C ratio, is normally approximately 0.3 for both methods.

Furthermore in accordance with both methods the mixture of ground bauxite, caustic soda and water is concentrated at a temperature of between 100° C. and 105° C. at atmospheric pressures and the impurities are removed as a so-called red mud. After such a concentration there is left a solution of caustic soda and dissolved alumina. In the European method the red mud is subsequently washed and the washed water which contains some aluminum hydrates is again mixed with the overflow.

In accordance with both of these known methods a supersaturated solution of alumina in sodium hydroxide is obtained. Sodium hydroxide concentration in the European method is somewhat higher than that in the American method, but the A/C ratio according to both methods is approximately 0.6.

This supersaturated solution of alumina and caustic soda, referred to as a mother liquor is now seeded with crystals, normally of aluminum hydrate. In accordance with the European method fine crystals are employed in a quantity of about 200 g/l to 400 g/l. The American method uses fine and medium-coarse seed crystals in a quantity of about 30 g/l to 150 g/l.

Thereafter the liquid is agitated and conveyed through a succession of series-connected stirrer-tanks. In accordance with the American method, the temperature is decreased from approximately 80° C. at the furthest upstream stirrer-tank to about 60° C. at the last stirrer-tank, whereas in the European method the temperature drops from 65° C. to approximately 50° C. During agitation part of the dissolved alumina goes into suspension as aluminum hydroxide. The American method produces coarse, medium-coarse, and fine crystals and the European method produces mainly fine crystals.

In accordance with the European method the crystals so produced are separated by means of a single-stage filtration and a portion is returned to the process as seed crystals with the remainder of the crystals being separated out and calcined to alumina which is later on used for the production of aluminum. The American method separates the crystals in a three-stage decantation procedure with the coarse crystals being retained as the product for later production of alumina and the medium coarse and fine crystals being returned to the cycle as seed crystals.

After the separation out of these crystals there is still dissolved alumina in the liquor at a A/C ratio of approximately 0.3. This liquor is retured to the original concentration autoclave.

The term fine crystals is here meant to cover crystals of which no more than 10% have a mesh size greater than 74 microns, no more than 50% have a mesh size between 44 microns and 74 microns, and the remainder have a mesh size smaller than 44 microns. The term medium-coarse crystals here is intended to cover crystals of which no more than 20% have a mesh size greater than 74 microns, approximately 55% have a mesh size between 44 microns and 74 microns, and the remainder have a mesh size less than 44 microns. Coarse crystals refers to crystals of which approximately 25% have a mesh size greater than 74 microns, approximately 65% have a mesh size lying between 44 microns and 74 microns, and the remainder have a mesh size smaller than 44 microns.

The European method produces a large quantity of fine alumina crystals which can be calcined to give anhydrous alumina that is then reduced to form aluminum. The handling of such fine crystals as well as their transporting is rather difficult. Such a fine aluminum oxide therefore has considerable losses in the form of dust and in subsequent electrolytic treatment the fine crystals do not take on the fluorine well. Since fluorine is an extremely toxic element such losses of fluorine gas must be avoided at all cost.

The American method produces substantially coarser crystals, but it is necessary to use a relatively thin lye solution. Thus, it is necessary to work a large quantity of liquid in accordance with the American process so that a considerable equipment expense and complex procedures must be employed.

It has been suggested to improve on the American method by providing a row of separator-agitator tanks and classifiers so as to produce a relatively coarse aluminum oxide hydrate. In such an arrangement, although the product is superior, again a large equipment cost is encountered.

Cooling of the lye has also been suggested to make the separation of additional aluminum oxide possible. However, a great amount of very fine aluminum oxide trihydrate crystals is produced in accordance with this method, and these crystals are not suitable for the commercial production of aluminum oxide or even for use as seed crystals. Another disadvantage of this method is that additional separator-agitator tanks must be provided to precipitate additional hydrate crystals from the cooled lye and special filters, concentration, and sedimentation tanks are required to remove the fine solids from the lye solution.

Coarse aluminum oxide is also produced according to a method in which extremely fine seeding crystals are prepared in a separate process. Such a method only produces a limited quantity of coarse crystals and requires an entirely separate plant to form the necessarily fine seed crystals that are added to the fresh mother liquor. In addition it is necessary with this method to use a larger number of separator-agitator tanks.

Various systems for extraction alumina from bauxite are described in the U.S. Pat. Nos. 2,707,669, 3,543,923, and 3,632,310.

SUMMARY OF THE INVENTION

It is therefore an object of the present invention to provide an improved apparatus for extracting alumina from bauxite.

Another object is the provision of an improved separator-agitator or stirrer tank for use in such a process.

Yet another object is to provide a relatively simple plant that can produce coarse alumina crystals.

These objects are attained according to the present invention in an apparatus wherein the supersaturated lye solution is introduced into at least one product stirrer tank where it is agitated at a temperature of between 75° C. and 90° C. Aluminum hydrate crystals are introduced into this tank for seeding of the solution therein so that a portion of the dissolved alumina in the tank precipitates as aluminum hydrate, forming a suspension. These aluminum hydrate crystals are removed from this solution and can be calcined to alumina.

In accordance with another feature of this invention a cascade of such stirrer tanks is employed. The supersaturated solution is introduced into all of these tanks in parallel, but the seed crystals are only introduced into one of the stirrer tanks. Thereafter the crystals are passed from this one stirrer tank through the entire cascade or row of stirrer tanks and the crystals that are subsequently removed from the process for calcining or the like are only removed from the last tank in the cascade or row.

According to yet another feature of this invention a cascade of secondary stirrer tanks is provided in which the seed crystals are produced. All of the partly spent liquor from the first or product cascade is fed to the first in the row of seeding cascade stirrers and the seed crystals are only pulled off the last in the row of these stirrer cascasade and fed back to the first of the product cascade. With this arrangement the almost completely spent liquor from the last stirrer of the seeding cascade is fed through an evaporator back to the autoclave in which the original solution of ground bauxite and caustic soda is produced. Thus an almost completely closed process is obtained which produces a large percentage of coarse alumina crystals eminently suitable for subsequent calcining.

According to another feature of this invention a separator stirrer tank is provided which has an upright central agitator shaft that carriers at three different levels stirrer arms, in a first stirring zone having a relatively large solids content, between 40% and 60% by volume, a second or middle stirring zone with a medium solids content between 10% and 20% by volume, and a third or upper stirring zone with a very low solids content, between 1% and 5% by volume. The stirrer arm in the middle zone has a pair of paddles which are set at different angles so as effectively to mix and agitate the solution therein. The upper arm offers minimum resistance to fluid flow so as to encourage settling of the heavier crystals in the tank. All of the arms carry at their ends paddles which closely sweep the inside of the tank at a speed of approximately 10 cm per second.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

SPECIFIC DESCRIPTION OF PREFERRED EMBODIMENTS

Figure 1:
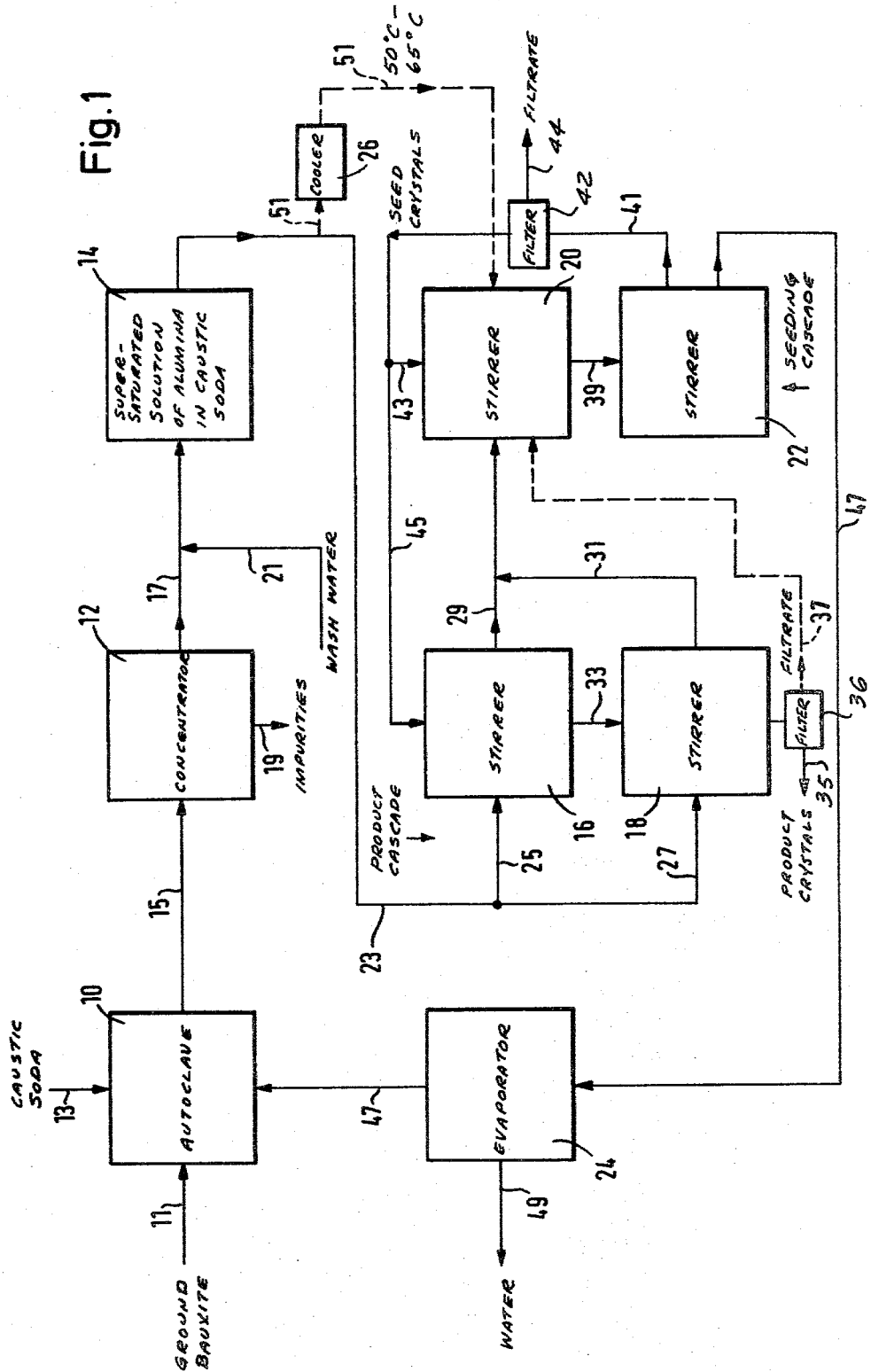
FIG. 1 is a flow chart illustrating the method which is carried out by the apparatus according to this invention.

FIG. 1 is a flow sheet of an installation for the manufacture of coarse-grained alumina crystals using a concentrated caustic sode lye (325–600 g/l expressed as $Na_2CO_3$), according to the present invention.

The bauxite is ground, as previously, and conveyed by way of duct 11 into autoclave 10, into which caustic soda of a predetermined concentration is delivered by way of duct 13. Ducts are all suitable pipe lines as well as other means of conveyance and transportation appropriate for any given case of use. The temperature in the autoclave can be, for example, about 220° to 250° C., the pressure can equal approximately 45 bar. The concentration of caustic soda in the digestion liquor in autoclave 10 is equal to approximately 325 to 600 g/l, expressed as $Na_2CO_3$ in g/l. The ratio A/C, i.e., the ratio of the dissolved aluminum oxide in g/l to the dissolved caustic soda in g/l in autoclave 10 before the reaction is approximately 0.3.

The ground bauxite is mixed in autoclave 10 with the caustic soda solution at the abovementioned temperature and pressure, whereby the alumina is dissolved to an A/C ratio of around 0.6. After mixing, the liquor or mixture is removed from autoclave 10 by way of duct 15 and conveyed into one or several concentrators 12 in which the mixture is concentrated at atmospheric pressure and a temperature of around 100° to 105° C. The impurities, which were not dissolved and remain suspended in the liquor, are removed as red mud from concentrator 12 by way of duct 10 and washed. The caustic soda and alumina remaining in the red mud are washed out and the red mud is disposed of. The wash water containing caustic soda and alumina is removed by way of duct 21 and conveyed into tank 14. The liquor from concentrator 12, from which the impurities were mostly removed, is also conveyed into tank 14 by way of duct 17. Tank 14 now contains a supersaturated solution of alumina in caustic soda, which is also referred to as mother liquor. The temperature in tank 14 is approximately between 75° C. and 90° C.

This hot mother liquor is conveyed from tank 14 by way of duct 23 and ducts 25 and 27 equally to a number of separator-agitator tanks 16 and 18 of same design as the separator-agitator or stirrer tank according to the invention shown in FIGS. 5 to 10. The separator-agitator tanks 16, 18 form a cascade and in practice about eight to twelve such stirrer-tanks are used. The drawing contains only two of these stirrer-tanks, for simplicity. It is very important that all separator-agitator tanks 16, 18 are equally supplied from tank 14 with fresh, hot mother liquor here a supersaturated solution of alumina in caustic soda.

Aluminum hydrate crystals, referred to as product crystals in the following, are formed in the separator-agitator tanks during agitation, i.e., the crystals which are introduced as seeding crystals into the first separator-agitator tank 16 grow during their passage through the individual separator-agitator tanks of the cascade. Unlike the hot mother liquor introduced into all of the separator agitator tanks 16, 18, the crystals which are formed in the individual separator-agitator tanks and those which are introduced into the first separator-agitator tank 16 as seeding crystals are successively carried in the flow direction through all the separator-agitator tanks of the cascade. The crystals are then drawn off from the last separator-agitator tank 18 of the cascade and removed as product by way of duct 35 after having passed through inserted filters, not described in detail. Mainly coarse aluminum hydrate crystals as defined above are obtained as the product.

The duct or ducts 33 are used for conveying the crystals through the particular separator-agitator tanks of the cascade.

The overflow from separator-agitator tanks 16 and 18 of the product cascade is conveyed from each stirrer-tank by way of ducts 29 and 31, combined and then introduced into at least the first separator-agitator tank 20 of a further separator-agitator tank group designated as the seeding cascade. The partly spent liquor from the separator-agitator tanks of the product cascade still contains dissolved alumina. Into the first separator-agitator tank 20 of the seeding cascade, also consisting of several separator-agitator tanks, there can be introduced by way of duct 37 filtrate produced during the filtration of the crystals which are drawn off from the last separator-agitator tank 18 of the product cascade. The separator-agitator tanks 20 and 22 of the seeding cascade can be of known design. The liquor still containing dissolved alumina together with suspended crystals is successively conveyed through all separator-agitator tanks of the seeding cascade by way of ducts 39 and agitated at a temperature of about 65° to 50° C.

From the last separator-agitator tank 22 of the seeding cascade, in which crystals are formed during the agitation or wherein crystals already present increase in size, the crystals are removed by way of duct 41 and are separated using inserted filters, not described in detail, and conveyed by way of ducts 43 and 45 for seeding of separator-agitator tanks 16 or 20, of the product cascade or the seeding cascade, respectively.

In other words, a portion of the crystals removed from separator-agitator tank 22 of the seeding cascade is introduced into the first separator-agitator tank 16 of the product cascade for seeding, whereas the other larger portion of the crystals removed from separator-agitator tank 22 is returned into the first separator-agitator tank 20 of the seeding cascade.

The spent liquor removed from separator-agitator tank 22, i.e., from the last separator-agitator tank of the seeding cascade, is returned by way of duct 47 to autoclave 10, because it still contains useable dissolved alumina. An evaporator or concentrator 24 can be inserted in order to re-establish in the spent liquor coming from separator-agitator tank 22 the starting concentration, as it is in autoclave 10. The water removed during the concentration can be evacuated by way of duct 49.

According to one embodiment, the saturated or supersaturated mother liquor from tank 14 can be conveyed by way of duct 51 at least to the first separator-agitator tank 20 of the seeding cascade, after it has been cooled to a temperature of around 50° to 65° C. by means of a heat exchanger 26.

A quantitative example will now be given in the following, before other embodiments are described.

In autoclave 10 are introduced, as previously mentioned, ground bauxite and caustic soda. According to the American method, the concentration of caustic soda is 160 g/l, according to the European method it is about 325 g/l and in the method according to the present invention about 325 g/l, while the lowest limit of the caustic soda concentration is used for comparison. In the American method, an aluminum oxide content of 48 g/l results from an A/C ratio of 0.3; in the European method, a content of 97.5 g/l; and in the method according to the present invention, also 97.5 g/l. After concentration, the same mother liquor concentration as before is obtained at an A/C ratio of about 0.6. In the European method, as well as in the method according to the present invention, the wash water from the red mud is added for the same A/C ratio of 0.6, a caustic soda concentration of 240 g/l and an aluminum oxide concentration of 144 g/l are obtained. In the American method, the caustic soda concentration amounts to 160 g/l and the aluminum oxide concentration to 96 g/l.

The mother liquor is now agitated to an A/C value of 0.3 whereupon the American method results in 48 g/l of aluminum hydrate crystals, while the European method results in 72 g/l aluminum hydrate crystals as product.

According to present invention separator-agitator tanks 16, 18 of the product cascade are supplied with mother liquor having an A/C ratio of approximately 0.6, a liquor concentration of approximately 240 g/l and an aluminum oxide concentration of approximately 144 g/l. This liquor is stirred in the product cascade until an aluminum oxide concentration of approximately 108 g/l is obtained, while the liquor concentration remains unchanged. In addition, a quantity of approximately 36 g/l seeding crystals is introduced into the first separator-agitator tank 16. Thus, the last separator-agitator tank 18 of the product cascade provides 72 g/l of aluminum hydrate crystals as product, resulting from the 36 g/l seeding crystals and the difference between 108 g/l and 144 g/l, i.e., the values present in the product cascade after and before agitation, respectively.

The partly spent liquor containing 108 g/l aluminum oxide is then introduced into the first separator-agitator tank 20 of the seeding cascade and subsequently agitated out until after the last separator-agitator tank of the seeding cascade the concentration of aluminum oxide has dropped to 72 g/l, while the caustic soda concentration (240 g/l) remains unchanged. The difference between 108 g/l and 72 g/l. i.e., 36 g/l crystals, is removed from the last separator-agitator tank 16 of the product cascade. Into the first separator-agitator tank 20 of the seeding cascade is introduced about 200 to about 400 g/l seeding crystals, however, this quantity is only maintained in circulation in the seeding cascade and is practically without influence on the quantity of seeding crystals which is introduced into the first separator-agitator tank 16 of the product cascade.

It therefore follows that the present invention provides the same yield of aluminum hydrate crystals as the European method, while the crystals which are produced are coarse crystals, as desired.

Thus, according to the present invention, the crystals are separated from the partly spent mother liquor at an A/C ratio between about 0.5 and 0.35 preferably between about 0.43 and 0.45. The crystals which were separated from the partly spent mother liquor are subsequently suspended in a fresh, supersaturated hot mother liquor in order to further increase the size of crystals, as the crystals have to pass successively through the product separator-agitator tanks, whereas the hot supersaturated mother liquor is introduced in parallel into these stirrer-tanks. Crystal growth rate increased by the high temperature of the liquor, between approximately 75° C. to 90° C., and preferably between 80° C. to 85° C. The usual A/C ratio of about 0.6 before the separator-agitator tanks, and about 0.3 after the separator-agitator tanks, is retained. The caustic soda concentration of the digestion liquor is kept at 200 g/l to 300 g/l and, preferably about 250 g/l (expressed as $Na_2CO_3$). The high temperature in the product cascade and the continuous addition in parallel of the fresh supersaturated mother liquor increase the growth of the crystals and the size of the crystals, whereas the lower liquor temperature in the seeding cascade intensifies nuclei formation, i.e., the development of new crystals from the solution.

It could be established that the growth rate of hydrate crystals by supersaturation at 85° C. is about 8 to 10 times greater than at 50° C. It was also found that by doubling the degree of supersaturation of the mother liquor at 85° C., the growth rate of crystals is increased by a factor of four. The increased temperature in the product cascade and the continuously renewed introduction of supersaturated mother liquor brings about a high growth rate of crystals, whereas in the seeding cascade nuclei formation prevails because of the lower temperature.

Figure 2:
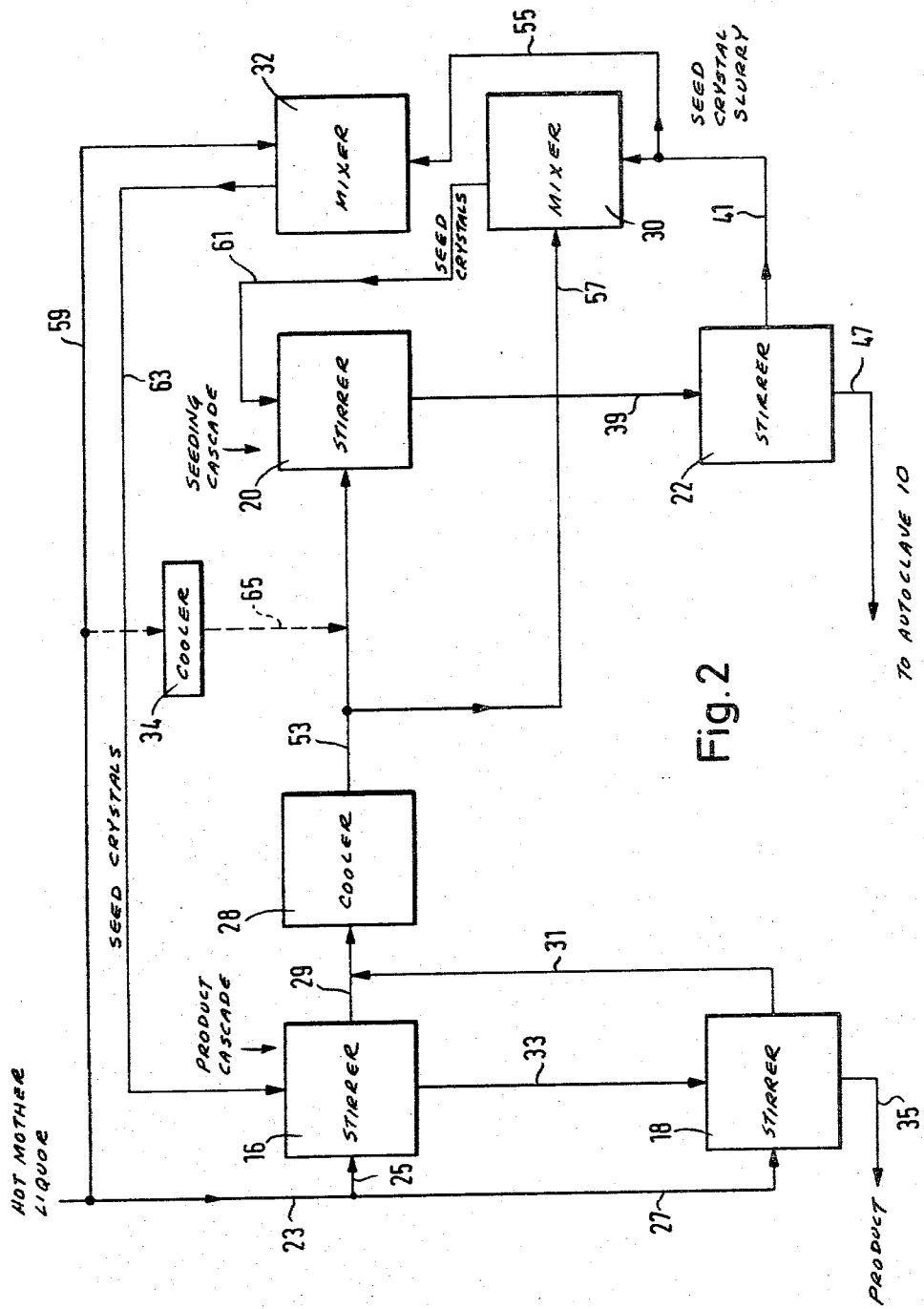
FIGS. 2, 3 and 4 are flow charts showing variations on the process carried out by the apparatus in accordance with this invention.

FIG. 2 shows a modification of the process according to FIG. 1. As in FIG. 1, the hot saturated or supersaturated mother liquor is conveyed from tank 14, not shown in FIG. 2, by way of duct 23 and the ducts 25 and 27 parallel to separator-agitator tanks 16, 18 of the product cascade. In this way, each separator-agitator tank of the product cascade is provided with fresh, hot, supersaturated mother liquor. The crystals pass through the particular stirrer-tank, in series, which are connected by duct 13 and the product is also removed by way of duct 35.

The partly spent liquor from the product cascade is cooled to about 65° C. to 50° C. by means of inserted heat exchangers and then introduced into the first separator-agitator tank 20 of the seeding cascade. As in FIG. 1, fresh, supersaturated mother liquor previously cooled to about 65° C. to 50° C. by means of a heat exchanger 34 can be introduced by way of duct 65. The cooled, partly spent liquor from the product cascade and the fresh, cooled, supersaturated mother liquor then pass together with the forming and existing crystals through the particular separator-agitator tanks 20, 22 of the seeding cascade. Here again, seeding crystal-slurry from the last separator-agitator tank 22 of the seeding cascade is removed by way of duct 41 and the partly spent liquor is conveyed by way of duct 47 back to the autoclave. The seeding crystal-slurry is directed by way of duct 41 and duct 55 branching off from it into mixer 30 and mixer 32. Into mixer 30 is conveyed a cold, partly spent liquor by way of duct 57, branching off from duct 53, which comes from the heat exchanger 28 and into which flows the cooled, partly spent liquor coming from the product cascade. Into mixer 32 is conveyed fresh, hot saturated or supersaturated mother liquor, by way of duct 59 which branches off from duct 23. In this context hot liquor is defined as a liquor having a temperature of about 90° C. to 75° C. and cold liquor that has a temperature of about 65° C. to 50° C. The seeding crystal-slurry which is directed into mixers 30 and 32 by way of ducts 41 and 55, respectively, is suspended in cold lye in mixer 30 and in hot lye in mixer 32. The seeding crystals suspended in the cold lye are thereafter conveyed by way of duct 61 from mixer 30 into the first separator-agitator tank 20 of the seeding cascade, whereas the seeding crystals suspended in the hot lye are conveyed from mixer 32 by way of duct 63 into the first separator-agitator tank of the product cascade. The fresh mother liquor remains in the separator-agitator tanks of the product cascade from about 5 hours to about 25 hours. Instead of conveying a partly spent, cooled lye from the product cascade to mixer 30, a fresh, cooled, supersaturated mother liquor by way of duct 65, or a mixture of a fresh, cooled mother liquor and of a partly spent, cooled liquor can be introduced.

After the mother liquor has been kept in the separator-agitator tanks of the product cascade for a sufficient time, which in the embodiments shown in FIGS. 1 and 2 amounts to 5–25 hours as mentioned above, a coarse-grained aluminum hydrate can be obtained, in which the proportion of grains having a size less than about 44 microns is less than 5%.

Figure 3:
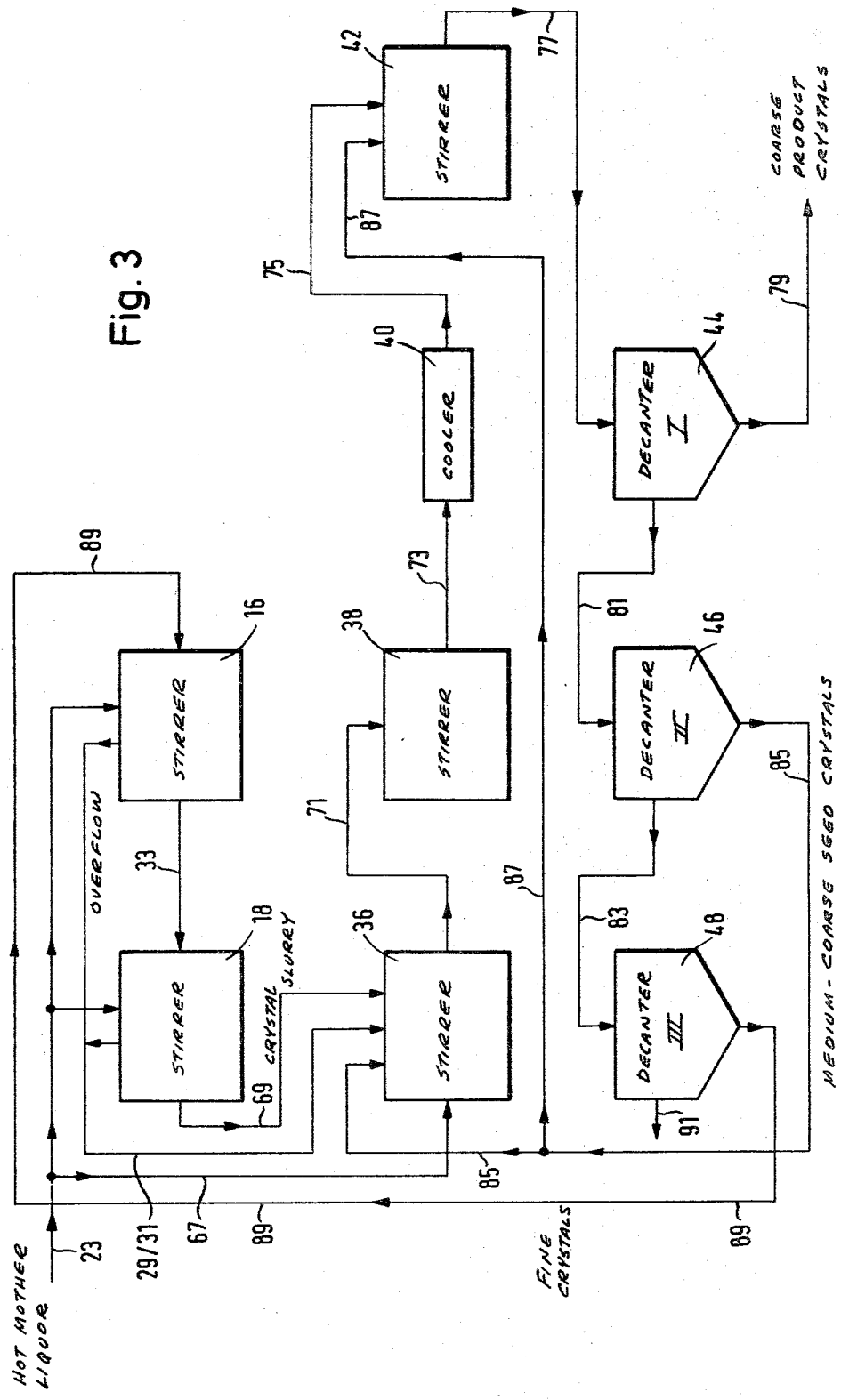

FIG. 3 shows a further embodiment of the invention. In this embodiment a fresh, hot supersaturated mother liquor is introduced into the separator-agitator tanks 16 and 18 of the product cascade in parallel. As in the previous embodiments, the caustic soda concentration is about 200 to 300 g/l, preferably about 240 g/l. The overflow, i.e., the partly spent liquor from the separator-agitator tanks of the product cascade, is conveyed by way of ducts 29/31 into the first separator-agitator tank 36 of a further cascade, also consisting of several separator-agitator tanks e.g., 8 to 12. The separator-agitator tanks 36, 38 can be designed in the same manner as the stirrer-tanks according to the present invention, but prior art stirrer-tanks can also be used. Fresh, hot mother liquor is also conveyed into the first separator-agitator tank 36 of this cascade by way of duct 67 which branches off from duct 23. Into stirrer-tank 36 is introduced, by way of duct 69, the crystal-slurry removed from the last separator-agitator tank 18 of the product cascade. The crystals of this crystal-slurry as before pass through the separator-agitator tanks 16, 18 of the product cascade in series and are separated from the partly spent liquor. The concentration of solids being discharged from separator-agitator tank 18 is from about 40 to about 65%. Into the separator-agitator tank 36 are also added, by way of duct 85, mainly medium-coarse grained seeding crystals, which will be described in the following in more detail. This mixture is agitated in the separator-agitator tanks 36, 38, practically comparable with the seeding cascade according to FIGS. 1 and 2, and the entire material, i.e., the spent liquor and the crystals suspended in it, together pass through separator-agitator tanks 36, 38 of the cascade in series. These tanks are interconnected by ducts 71.

The liquor and the crystals leave separator-agitator tank 38 by way of duct 73. Thereafter, the mixture is conveyed through heat exchanger 40 in which it is cooled to a temperature of about 65° C. to 50° C. The mixture is then by way of the duct 75, introduced into separator-agitator tank 42 which can be the first separator-agitator tank of the following cascade or, in one embodiment also a single separator-agitator tank. For simplicity, only one separator-agitator tank 42 is shown; but when several separator-agitator tanks 42 are connected in a cascade in series, then the entire mass, i.e., the liquor plus the suspended crystals, passes through all the separator-agitator tanks 42 in series and is drawn off from the last separator-agitator tank.

Also introduced into separator-agitator tanks 42 are mainly medium-coarse seeding crystals, by way of duct 87 branching off from duct 85. The mixture is agitated, in the separator-agitator tank (or several tanks) 42, and the liquor plus the suspended crystals are drawn off together by way of duct 77 and introduced into a first decanter 44. From decanter 44, the coarse crystals are drawn off as product by way of duct 79, whereas the overflow is introduced into a second decanter 46 by way of duct 81. The medium-coarse seeding crystals are drawn off from decanter 46 by way of duct 85 and conveyed into separator-agitator tanks 36 and 42, whereas the overflow from decanter 46 is introduced into a third decanter 48 by way of duct 83. Fine crystals are drawn off from decanter 48 by way of duct 89 and introduced into the first separator-agitator tank 16 of the product cascade. The overflow from decanter 48 is returned to autoclave 10 by way of duct 91.

The temperature in the cascade, formed by separator-agitator tanks 36 and 38 is, as in the product cascade, about 90° C. to 75° C., decreasing in the direction of flow from its upper value to its lower value. The temperature in separator-agitator tank 42 or in the separator-agitator tanks 42 respectively is, as in the procedures according to FIGS. 1 and 2, between about 65° C. and 50° C., preferably between about 60° and 55° C. The amount of seeding crystals introduced in the first separator-agitator tanks, or at least into the first separator-agitator tank 16 of the product cascade, is from about 30 g/l to about 200 g/l, as in the procedures according to FIGS. 1 and 2. The quantities and the weight indications concerning the seeding crystals and the lye always refer to one litre of the whole mixture.

Instead of decanters 44, 46 and 48, disk filters can also be used.

Figure 4:
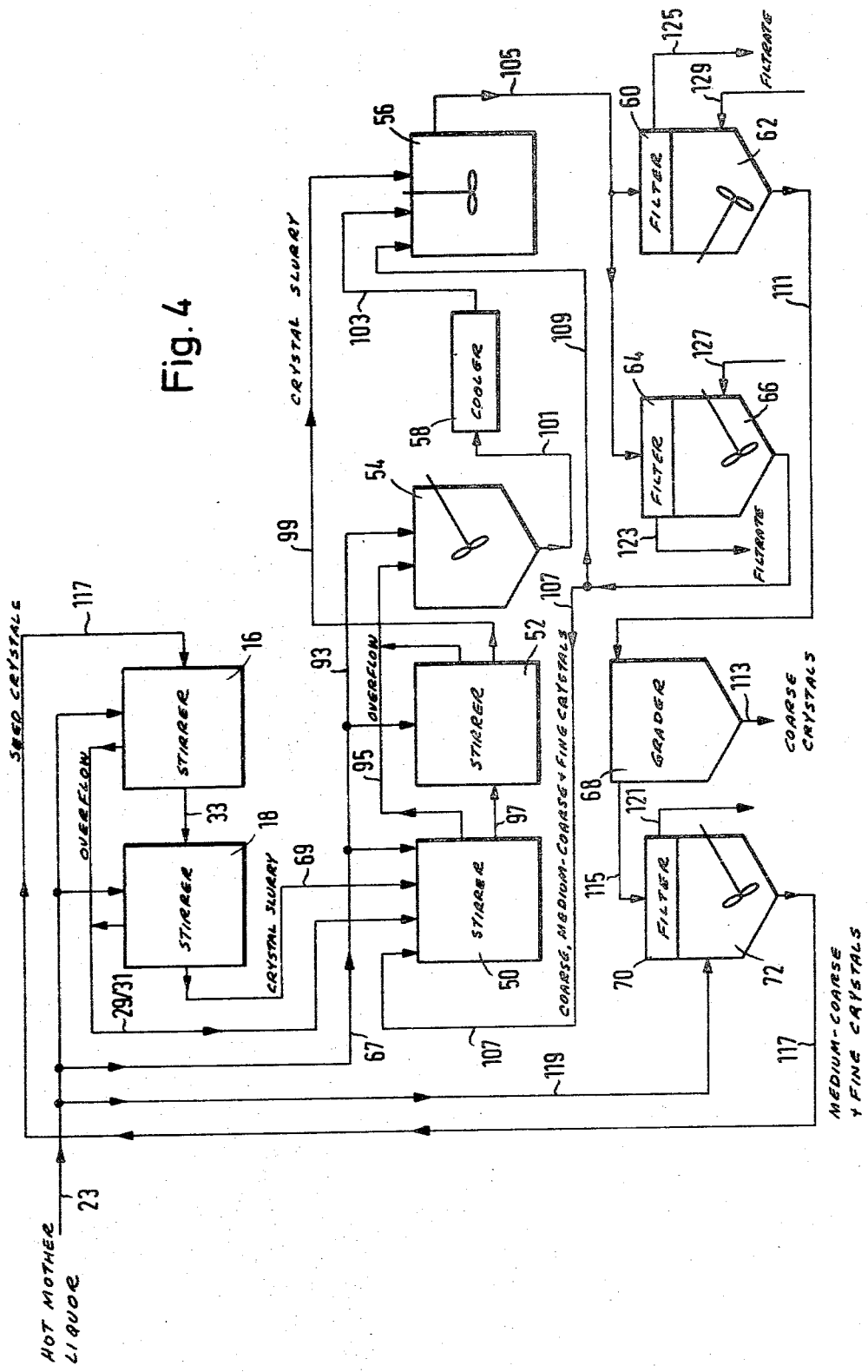

FIG. 4 shows another embodiment of the present invention. As described above, the fresh, hot supersaturated mother liquor is introduced into the separator-agitator tanks 16, 18 of the product cascade in parallel. As in the embodiment according to FIG. 3, a further cascade formed of separator-agitator tanks 50 and 52 is provided; here, separator-agitator tanks designed in accordance with the invention are used. The cascade formed by the separator-agitator tanks 50 and 52 can also contain about eight to twelve stirrer-tanks. The overflow from the separator-agitator tanks of the product cascade is introduced into the first separator-agitator tank 50 of the second cascade by way of ducts 29/31. Into the separator-agitator tank 50, by way of duct 69, is also introduced the crystal-slurry coming from the last separator-agitator tank 18 of the product cascade, after having been separated from the partly spent liquor, as described above. Also introduced into separator-agitator tank 50, by way of duct 107, are fine, medium-coarse and coarse seeding crystals, as will be described later in more detail. Finally, into the separator-agitator tank 50, by way of duct 23 branching off from duct 67, is introduced fresh, hot mother liquor.

In contrast to the embodiment according to FIG. 3, the fresh, hot mother liquor is introduced into each of the separator-agitator tanks 52 (only one shown) in parallel by way of duct 93 as in the case, for example, with the separator-agitator tanks of the product cascade. From the cascade formed by separator-agitator tanks 50, 52 the overflow, i.e. the partly spent liquor, is drawn off in parallel and introduced into separator-agitator tank 54 by way of duct 95. Into this separator-agitator tank is also added fresh, hot mother liquor by way of duct 93. The partly spent liquor and the fresh mother liquor are mixed in mixer 54, drawn off and by way of duct 101 conveyed through heat exchanger 58, in which the temperature is reduced from about 65° C. to 50° C. and, subsequently, by way of duct 103, introduced into a conventional separator-agitator tank 56.

The crystals successively pass through all separator-agitator tanks of the cascade 50, 52 and separated from the partly spent liquor, are drawn off from the last separator-agitator tank 52 and introduced directly into the conventional separator-agitator tank 56 by way of duct 99. Also introduced in this last separator-agitator tank are fine, medium-coarse and coarse seeding crystals by way of duct 109, which branches off from duct 107. The materials introduced into separator-agitator tank 56 by way of ducts 99, 103 and 109 are then mixed. The slurry which leaves the last separator-agitator tank 56 contains fine, medium-coarse and coarse hydrate crystals. A large portion of the slurry is used as seeding material and is not graded into different grain sizes, but is filtered in filter 64 and returned to the separator-agitator tanks 50 and 56 as seeding material.

The filtrate from filter 64 is spent liquor and is returned by way of duct 123 through an evaporator into the autoclave. The filter cake from filter 64 is again suspended in hot, fresh mother liquor and by way of duct 107 conveyed into separator-agitator tanks 50 and 56.

The smaller portion of the slurry within leaves the last separator-agitator tank 56 passes through a filter 60 where the solids are separated from the liquor. The filtrate, by way of duct 125 is combined with the filtrate from filter 64 and, after concentration in an evaporator, is returned to autoclave 10.

The filter cake from filter 60 contains fine, medium and coarse hydrate crystals. This filter cake is again suspended in a hot, diluted filtrate. The resuspended filter cake from filter 60 passes through a grader 68, in which the coarse material particles settle and from which the fine and medium hydrate crystals are removed by way of the overflow 115 from the grader. This overflow 115 is directed to filter 70 where the fine and medium crystals are removed. The filtrate, containing only dilute caustic soda, is mixed with the filtrates from filters 60 and 64 by way of duct 125 and after passing through an evaporator, returned to autoclave 10.

Figure 5:
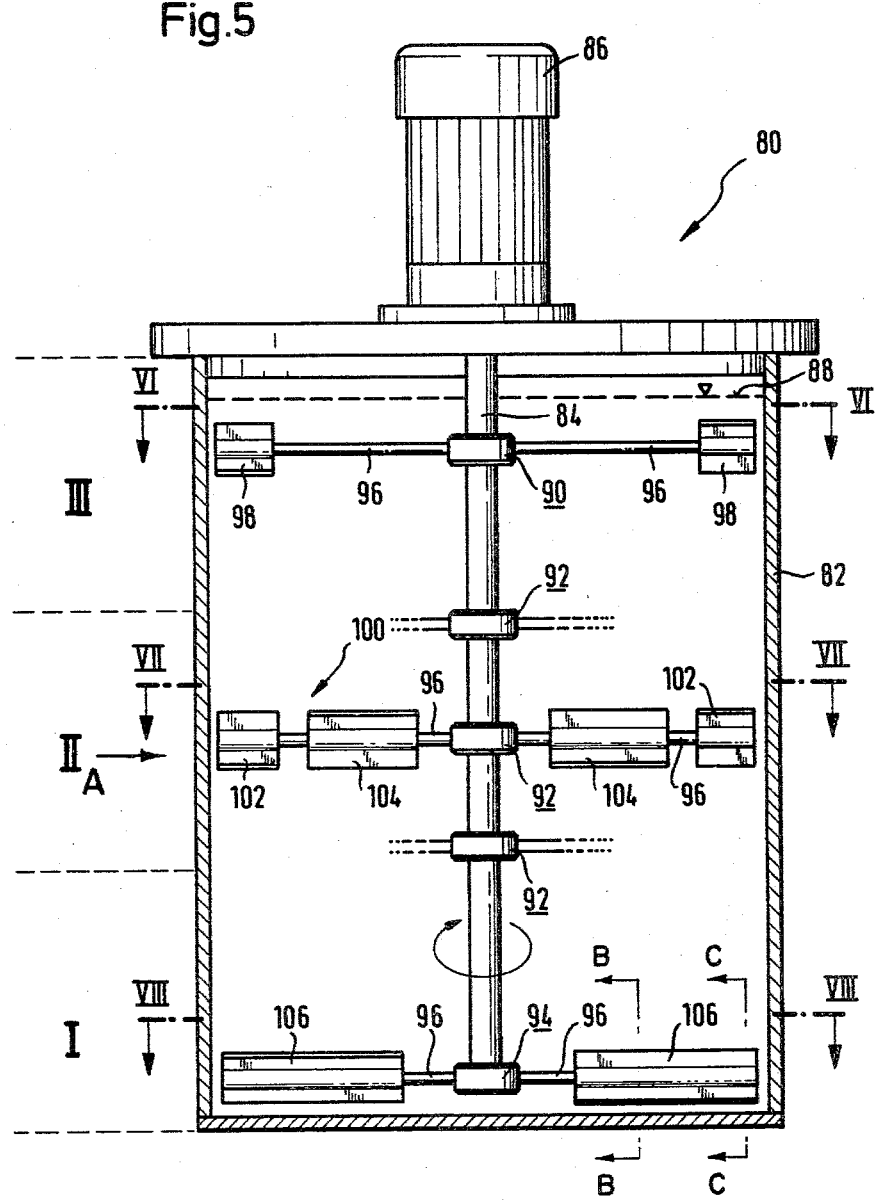
FIG. 5 is a vertical axial section through a PC stirrer tank with a rotatable shaft which carries a plurality of arms located in vertically spaced lower middle and upper zones and provided with paddles, in accordance with this invention.

FIG. 5 shows a separator-agitator tank 80 according to the invention. In particular, it comprises a vessel or container 82 in which is mounted a vertical shaft or axle 84, rotating around its vertical axis and driven by a gear transmission and motor 86. On axle 84 are mounted several stirring members 90, 92, 94, placed at several levels above and below one another. All stirring members are placed below the surface 88 of the material to be treated.

Figure 13:
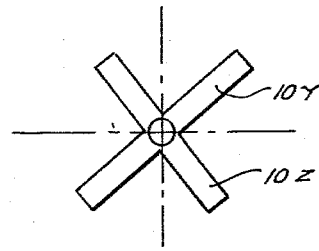
FIG. 13 is a view taken along the direction indicated by arrow A in FIG. 5.

The inside of the container 82 can be subdivided into three stirring zones I, II and III. In the lowest zone I is mounted at least one stirring member 94 provided with at least one radially placed stirring arm or paddle 106 extending from the vicinity of the stirrer axle to close to the inner wall of container 82. The radial length of the stirring arm 106 can be shorter if desired. The stirring member 94 can be provided with two to six stirring arms 106, angularly offset from one another, preferably with two stirring paddles angularly offset by 180° with respect to each other. In the middle zone II is mounted at least one stirring 92 with at least one radially placed stirring arm 100 which is divided perpendicularly to its longitudinal axis into at least two stirring arm segments 102, 104 which from point to point are pitched differently relative to their horizontal rotation plane. In the embodiment shown, each stirring member 92 has two stirring arms staggered by 180° with respect to one another. It is an advantage for the stirring arm segments which are placed on the same radius to have the same pitch, i.e., that the inner stirring arm segments 104 have the same pitch and the outer stirring arm segments also both have the same pitch, but different from that of the inner segments. As mentioned above, the outer segments of the stirring arm 102 must have a pitch which is opposite to those of the inner stirring arm segments 104 as shown in FIG. 13.

As shown in zone II, there are preferably several stirring members 92 (e.g. three or four) which are mounted on axle 84 above one another. Hereby the stirring arm segments 102 or 104 of the stirring arm 100 in all stirring members 92 can have the same pitch or a pitch which differs from one stirring member to another. In other words, all inner segments of the stirring arm 104 can have the same pitch for all the stirring members 92 or the pitch can change from one stirring member 92 to another stirring member 92. The same applies for the outer stirring arm segments 102.

In the upper zone III is mounted at least one member provided with at least one stirring arm 98 which is radially mounted in the space between the axle 84 and the inner wall of the container 82. In the embodiment shown, the stirring member 90 has two to six stirring arms or paddles 98, but, preferably, two stirring arms 98 angularly offset by 180° with respect to each other which are connected with the axle 84 by means of a rod 96 which only causes a small drag. Although two stirring arms per stirring member are preferred, each of the stirring members 90, 92 and 94 can also be provided with more than two stirring arms. The stirring arms 100 of the stirring members 92 can be subdivided into more than two stirring arm segments set at a different pitch from segment to segment in regard to the rotation plane. When, at times, several stirring implements 90 or 94, respectively, are provided in zones I and III, then in each of the particular zones I or III, respectively, the stirring arms 106 or 98, respectively, of the stirring members 94 or 90, respectively, of the zone can have the same pitch or a pitch which differs from one stirring member to another.

Figure 6:
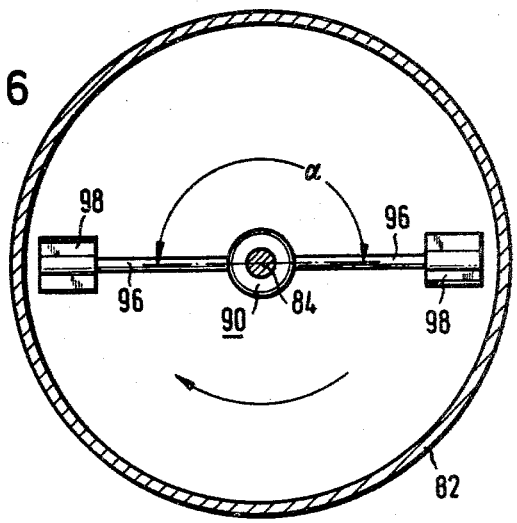
FIGS. 6, 7 and 8 are sections taken along lines VI—VI, VII—VII, and VIII—VIII of FIG. 5, respectively and showing two arms in each zone.
Figure 7:
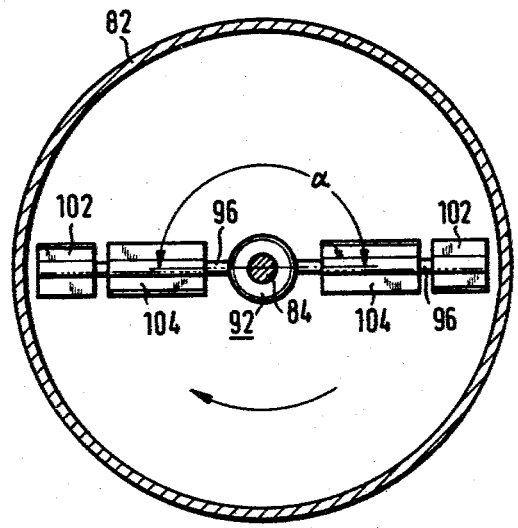
Figure 8:
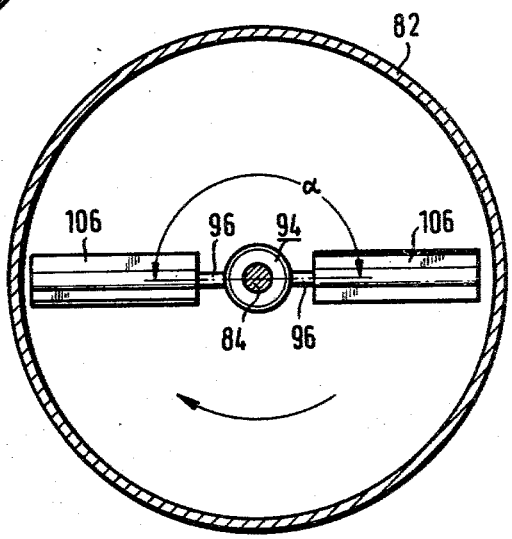
Figure 6A:
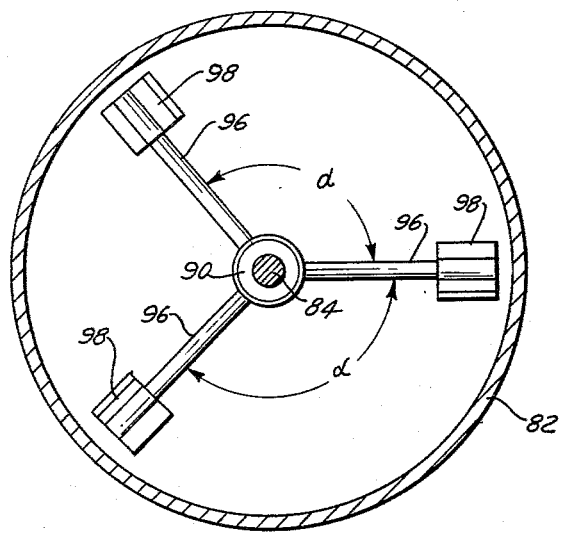
FIG. 6a is a view substantially corresponding to that of FIG. 6, but showing three arms in the upper zone.

As shown in FIGS. 6, 7 and 8, in each case the stirring arms of particular stirring paddles are set at an angle a of 180° in respect to one another. However, the angle a can be smaller than 180° and can, particularly, be about 120° to 160° as shown in FIG. 6a for three stirring arms.

Figure 11A:
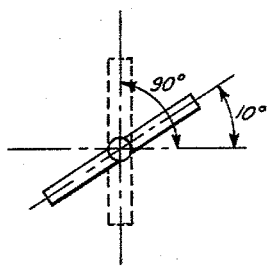
FIGS. 11a–11c are view showing angles of inclination of the paddles in the lower, middle and upper zones, respectively.

The angle of pitch of the stirring arms 106 in zone I is from about 10° to about 90°, preferably from about 45° to about 90°, as shown in FIG. 11a.

Figure 11B:
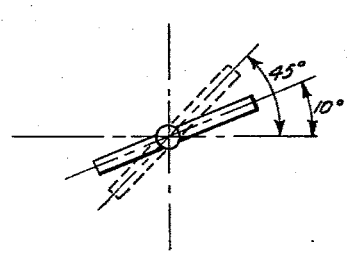
Figure 11C:
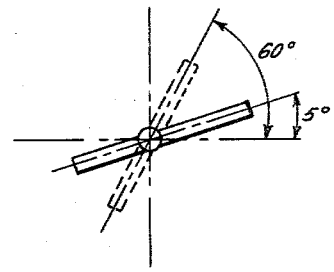

The angle of the pitch of the stirring arms or stirring arm segments 102, 104, respectively, in zone II are from about 10° to about 45°, preferably from about 20° to about 40°, as shown in FIG. 11b. The angle of pitch of stirring arms 98 in zone III is from about 5° to about 60°, preferably from about 15° to about 45°, as shown in FIG. 11c.

Figure 12A:
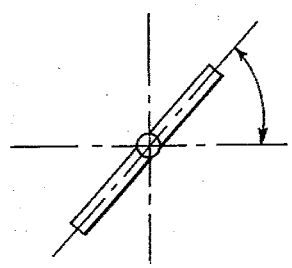
FIGS. 12a and 12b are sections taken along lines B—B and C—C of FIG. 5, respectively.
Figure 12B:
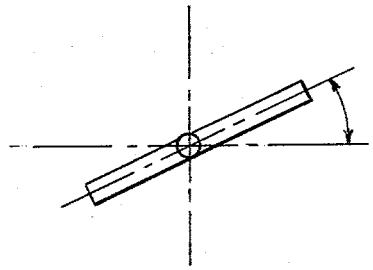

The angle of pitch of the stirring arms and of the stirring arm segments, respectively, can be made smaller with the distance from the stirrer axle increasing from the inside to the outside as shown in FIGS. 12a and 12b. Preferably, the angle of pitch of all stirring arms and stirring arm segments, respectively, is made the same inside a particular zone, but it can also be different.

The stirring members 90, 92 and 94 are set staggered from step to step, i.e., from stirring member to stirring member in respect to one another, by an angle, preferably of around 90°. The outer diameter of the particular stirring members 90, 92 and 94 can be made different and adapted to the shape of the container, which need not be cylindrical, but can have, for example, a conical shape or be barrel-shaped. The bottom of the container 82, for instance, can be made convex to the outside. The stirring arm and the stirring arm segments are shown in rectangular shape, but they can also be in the form of a trapeze, a disk or a disk segment.

Figure 9:
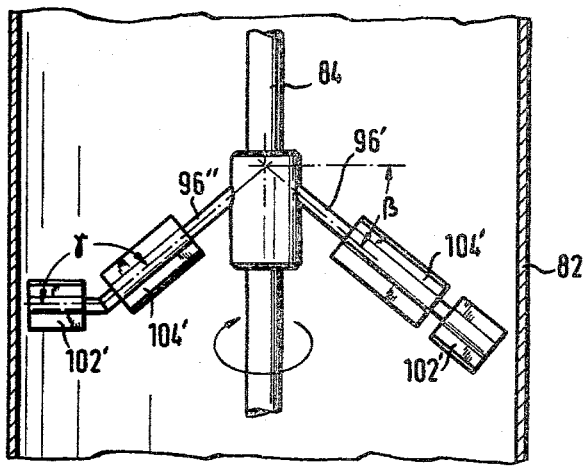
FIG. 9 is a vertical section illustrating an alternative form of a stirrer tank in accordance with this invention.

In the embodiment according to FIG. 9, the rods 96' are mounted at an angle $\beta$ to the rotation surface, i.e., to a plane perpendicular to the rotation axis, thus describing a frustocone when rotating. The pitch and the setting angle of the stirring arm segments 102' and 104' therefore refer to a cone-shell-shaped rotation surface.

As also shown in FIG. 9, the one rod 96" can also be bent at an angle $\gamma$, whereby the angle $\gamma$ can complement the angle $\beta$ to 180° in a way that the bent stirring paddle segment 102 (FIG. 9) is again in the rotation surface. But this is not necessarily required. For example, the angle $\beta$ can vary between about 10° to about 50° and preferably between about 10° to about 30°.

Figure 10:
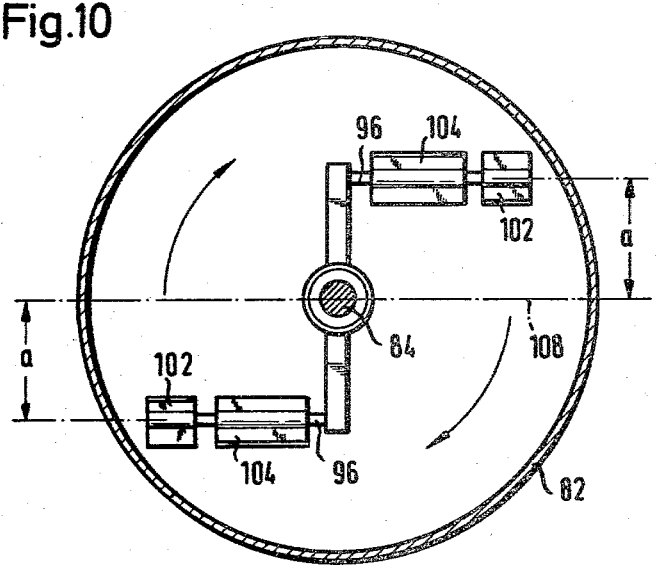
FIG. 10 is a horizontal section illustrating another variation of the stirrer tank according to the present invention.

In the embodiment according to FIG. 10, the two rods 96 are offset in the rotation plane by a distance a from a radial line 108 and are parallel to this line 108.

When the operator-agitator tank according to the invention, as designed in FIG. 5, is used in the method according to the present invention, the lowest zone I forms a settling zone with a high solids content (e.g., 40 to 65%) and from this zone the crystals and the crystal-slurry, respectively, are drawn off, as described in detail above. The crystal-slurry is kept in slow motion in zone I and this makes it possible for the particles suspended higher up to be able to settle in the settling zone. The peripheral speed of the crystal-slurry in the neighborhood of the inner wall of the container 82 is, in this zone, kept at about at least 10 cm/sec., in order to avoid or to reduce, as far as possible, incrustation of the wall and of the bottom of the container.

The middle zone II is the actual precipitation zone, i.e., here the mass is relatively strongly stirred, so that the fine crystals are kept in suspension, whereas the coarse crystals descend into the settling zone I.

The upper zone III forms the stabilizing zone because of the few and small stirring paddles. This brings about the production of a predominantly clear overflow, which does not contain more than about 5 g/l suspended hydrate particles. The partly spent liquor is drawn off from the range of zone I. The circumferential speed of the liquor in the neighborhood of the container wall is maintained at about at least 10 cm/sec., in order to avoid or to reduce, as far as possible, incrustation.

The method and the equipment according to the present invention is suitable not only for the production (for dispersion or separation, respectively) of aluminum hydrate crystals, but also for other granular materials such as, e.g., zinc, copper, tungsten, titanium, iron, uranium, etc.

It will be understood that each of the elements described above, or two or more together, may also find a useful application in other types of system differing from the types described above.

While the invention has been illustrated and described as embodied in an alumina-extraction method and apparatus, it is not intended to be limited to the details shown, since various modifications and structural change may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A separator-agitator tank for separating alumina from bauxite, comprising a closed vessel having a wall bounding an inner chamber which forms different upper, middle and lower treatment zones arranged to accommodate a solution with relatively low, medium and large solid contents, respectively; a rotatable shaft in said chamber which is radially inwardly spaced from said wall, and centered on and rotatable about an upright axis; a plurality of radially extending arms on said shaft for joint rotation with the latter and including at least one upper, middle and lower arm vertically spaced from each other and each located in a respective one of said different treatment zones; and a plurality of paddles arranged so that each of said arms is provided with at least one of said paddles for joint rotation therewith and the paddles of different arms are located in said different treatment zones, each of said paddles located in one of said zones being constructed differently than any of said paddles located in the other of said zones so that said paddles differently act on the solution, in dependence upon the solids content in each of said different treatment zones during rotation of said shaft, with relatively low, medium and high intensity in said upper, middle and lower treatment zones, respectively, said plurality of paddles including at least one lower paddle on said lower arm and extending in radial direction substantially from said shaft up to said wall of said vessel by a predetermined distance, said plurality of paddles further including at least one middle paddle on said middle arm, said middle paddle having inner and outer segments spaced from one another in said radial direction, said segments being inclined at different angles to an axial plane, said plurality of paddles further including at least one upper paddle on said upper arm and located adjacent to said wall and extending in said radial direction by a distance which is smaller than the distance by which said lower paddle extends.

2. The tank defined in claim 1, wherein said rotating means is operative to rotate said shaft for a speed of at least 10 cm/sec at the radially outer ends of said paddles.

3. The tank defined in claim 1 wherein said shaft carries a pair of such upper, middle, and lower arms extending radially in respective upper, middle, and lower planes perpendicular to said axis.

4. The tank defined in claim 3 wherein each arm is angularly offset about said axis from the other arm of the same pair by at most 180°.

5. The tank defined in claim 4 wherein said angle is between 120° and 160°.

6. The tank defined in claim 3 wherein each middle arm has a middle paddle having such inner (paddle) and lower segments.

7. The tank defined in claim 3 wherein said lower paddles lie in planes inclined at a lower angle of between 10° and 90° to a plane defined by said axis, the corresponding middle angle of said middle paddles of said middle zone is between 10° and 45°, and the corresponding upper angle of said upper paddles in said upper zone is between 5° and 60°.

8. The tank defined in claim 7 wherein said lower angle is between 45° and 90°.

9. The tank defined in claim 7 wherein said middle angle is between 20° and 40°.

10. The tank defined in claim 7 wherein said upper angle is between 15° and 45°.

11. The tank defined in claim 7 wherein said angles decrease away from said axis.

12. The tank defined in claim 3 wherein at least one of said arms has a section extending parallel to and offset from a diameter through said axis.

13. The tank defined in claim 12 wherein at least one of said arms lies at least partially at an angle to a plane perpendicular to said axis.

14. The tank defined in claim 13 wherein said one arm has a portion lying in said plane perpendicular to said axis.

15. The tank defined in claim 3 wherein said vessel is shaped as a body of revolution centered on said axis.

16. The tank as defined in claim 1, wherein said inner and outer segment of said middle paddle are inclined in opposite directions from a plane defined by said axis.

* * * * *